(12) United States Patent
Zhao et al.

(10) Patent No.: US 11,228,537 B2
(45) Date of Patent: Jan. 18, 2022

(54) RESOURCE PROCESSING METHOD AND SYSTEM, STORAGE MEDIUM AND ELECTRONIC DEVICE

(71) Applicant: BOE TECHNOLOGY GROUP CO., LTD., Beijing (CN)

(72) Inventors: Junjie Zhao, Beijing (CN); Jing Su, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/769,308

(22) PCT Filed: Dec. 4, 2018

(86) PCT No.: PCT/CN2018/119240
§ 371 (c)(1),
(2) Date: Jun. 3, 2020

(87) PCT Pub. No.: WO2019/109922
PCT Pub. Date: Jun. 13, 2019

(65) Prior Publication Data
US 2021/0176186 A1    Jun. 10, 2021

(30) Foreign Application Priority Data
Dec. 8, 2017  (CN) .......................... 201711299113.6

(51) Int. Cl.
H04L 12/923    (2013.01)
G16Y 40/10    (2020.01)
G16Y 40/35    (2020.01)
H04L 12/911    (2013.01)
H04L 29/08    (2006.01)

(52) U.S. Cl.
CPC ............ *H04L 47/762* (2013.01); *G16Y 40/10* (2020.01); *G16Y 40/35* (2020.01); *H04L 47/822* (2013.01); *H04L 47/828* (2013.01); *H04L 67/12* (2013.01)

(58) Field of Classification Search
CPC ... H04L 47/762; H04L 47/822; H04L 47/828; H04L 67/12; G16Y 40/10; G16Y 40/35
See application file for complete search history.

(56) References Cited

U.S. PATENT DOCUMENTS 9,554,410 B2    1/2017  Tsai et al.
10,298,505 B1 *  5/2019  Grant ..................... H04L 12/66
(Continued)

FOREIGN PATENT DOCUMENTS

CN    1801813 A    7/2006
CN    102056308 A    5/2011
(Continued)

OTHER PUBLICATIONS

International Search Report and Written Opinion for PCT/CN2018/119240 dated Feb. 27, 2019.
(Continued)

*Primary Examiner* — Tonia L Dollinger
*Assistant Examiner* — Jihad K Boustany
(74) *Attorney, Agent, or Firm* — Thomas | Horstemeyer, LLP

(57) ABSTRACT

A priority-based resource processing method and system, belonging to the technical field of information processing, are described. The priority-based resource processing method comprises: calculating a first priority of a first resource and a second priority of a second resource; determining whether the first priority of the first resource is higher than the second priority of the second resource; and when it is determined that the first priority is higher than the second priority, responding to a first operation request corresponding to the first resource.

19 Claims, 9 Drawing Sheets

(56) References Cited

U.S. PATENT DOCUMENTS

| | | | |
|---|---|---|---|
| 2011/0185130 A1 | 7/2011 | Hara et al. | |
| 2012/0327778 A1* | 12/2012 | Stanwood | H04L 47/6275 370/237 |
| 2013/0218574 A1* | 8/2013 | Falcon | G10L 15/22 704/275 |
| 2015/0264716 A1 | 9/2015 | Tsai et al. | |
| 2016/0366183 A1* | 12/2016 | Smith | H04L 63/101 |
| 2016/0381528 A1 | 12/2016 | Lee et al. | |
| 2017/0171778 A1* | 6/2017 | Britt | H04W 28/10 |
| 2017/0177406 A1* | 6/2017 | Chen | G06F 9/4831 |

FOREIGN PATENT DOCUMENTS

| | | |
|---|---|---|
| CN | 103365711 A | 10/2013 |
| CN | 103593408 A | 2/2014 |
| CN | 102056308 B | 6/2015 |
| CN | 107203395 A | 9/2017 |
| CN | 107357663 A | 11/2017 |
| EP | 2129151 A1 | 12/2009 |
| JP | 5634206 B2 | 5/2011 |
| JP | 2011097583 A | 5/2011 |

OTHER PUBLICATIONS

First Office Action for CN Patent Application No. 201711299113.6 dated Jan. 23, 2020.
Second Office Action for CN Patent Application No. 201711299113.6 dated Jun. 1, 2020.
Decision of Refusal for CN Patent Application No. 201711299113.6 dated Aug. 13, 2020.
Extended European Search Report for European Patent Application No. 18885631.4 dated Jul. 19, 2021.

* cited by examiner

| Device Group Resource |
|---|
| Device Type (memberType) |
| Current Number Of Devices (currentNrOfMembers) |
| Maximum Number Of Devices (MaxNrOfMembers) |
| Device Identifiers (memberIDs) |
| Number Of Subscriptions Of Group Resource (currentNrOfSubscriptions) |
| Number Of Retrieves Of Group Resource (totalNrOfRetrieve) |
| Number Of Updates Of Group Resource (totalNrOfUpdate) |
| Base Priority Of Group Resource (baseQosLevel) |
| Dynamic Priority Of Group Resource (dynamicQosLevel) |
| Current Dynamic Priority Of Start Time of Group Resource (dynamicQosStartTime) |
| Fanout Point (fanOutPoint) |

FIG. 4

RESOURCE PROCESSING METHOD AND SYSTEM, STORAGE MEDIUM AND ELECTRONIC DEVICE

CROSS REFERENCE TO RELATED APPLICATIONS

This application is the § 371 national phase application of PCT Patent Application No. PCT/CN2018/119240, filed on Dec. 4, 2018, which is based upon and claims priority to Chinese Patent Application No. 201711299113.6, titled "RESOURCE SUBSCRIPTION METHOD AND SYSTEM, STORAGE MEDIUM AND ELECTRONIC DEVICE", filed on Dec. 8, 2017, the contents of which being incorporated by reference in their entireties herein.

TECHNICAL FIELD

The present disclosure relates to the technical field of information processing and, in particular, to a priority-based resource processing method, a priority-based resource processing system, a computer-readable storage medium, and an electronic device.

BACKGROUND

With the development of the Internet-of-Things technology, increasingly more terminal devices access servers through networks. The Internet-of-Things service utilizes resources to express information such as functions and states of the devices, and controls the devices through operation on the resources. Commonly-used operations can include creation, retrieve, update, deletion, and notification operations.

It should be noted that the information disclosed in the background section above is only used to enhance the understanding of the background of the present disclosure, and therefore may include information that does not constitute the prior art known to those of ordinary skill in the art.

SUMMARY

Embodiments of the present disclosure relate to a priority-based resource processing method, a priority-based resource processing system, a computer-readable storage medium, and an electronic device.

According to one aspect of the present disclosure, a priority-based resource processing method is provided that is applicable to an Internet-of-Things (IoT) system. The method includes:

calculating a first priority of a first resource and a second priority of a second resource;

determining whether the first priority of the first resource is higher than the second priority of the second resource; and when determining that the first priority is higher than the second priority, responding to a first operation request corresponding to the first resource, wherein, before calculating the first priority of the first resource and the second priority of the second resource, the priority-based resource processing method further includes:

obtaining first priority impact parameters of the first resource and second priority impact parameters of the second resource;

wherein, calculating the first priority of the first resource includes:

calculating the first priority of the first resource according to the first priority impact parameters of the first resource; and wherein, calculating the first priority of the first resource according to the first priority impact parameters of the first resource includes:

assigning weight coefficients for the first priority impact parameters of the first resource; and performing calculations on the first priority impact parameters and the weight coefficients corresponding to the priority impact parameters, to obtain the first priority.

In an example embodiment of the present disclosure, after responding to the first operation request corresponding to the first resource, the priority-based resource processing method further includes:

after a first preset time interval, responding to a second operation request corresponding to the second resource.

In an example embodiment of the present disclosure, the first priority impact parameters include one or more of a first base priority, a number of subscriptions of the first resource, a number of retrieves of the first resource and a number of updates of the first resource.

In an example embodiment of the present disclosure, the first priority is a sum of a first weight coefficient*the first base priority, a second weight coefficient*the number of subscriptions of the first resource, a third weight coefficient*the number of retrieves of the first resource and a fourth weight coefficient*the number of updates of the first resource, wherein at least one of the first weight coefficient, the second weight coefficient, the third weight coefficient and the fourth weight coefficient is not zero.

In an example embodiment of the present disclosure, the first operation request includes one or more of a creation request, a retrieve request, an update request, a delete request, and a notify request.

According to one aspect of the present disclosure, a non-transitory computer-readable storage medium having a computer program stored thereon is provided. The computer program, when executed by at least one hardware processor, implements the priority-based resource processing method according to any one of the above.

According to one aspect of the present disclosure, an electronic device is provided that is applicable to an Internet-of-Things system, including:

at least one hardware processor; and a memory for storing instructions executable by the at least one hardware processor;

wherein the at least one hardware processor is configured to perform the priority-based resource processing method according to any one of the above by executing the executable instructions.

It should be understood that both the above general description and the following detailed description are exemplary and explanatory only and are not restrictive of the disclosure.

BRIEF DESCRIPTION OF THE DRAWINGS

The drawings herein are incorporated in and constitute a part of this specification, illustrate embodiments consistent with the present disclosure, and together with the description, serve to explain the principles of the present disclosure. Understandably, the drawings in the following description are merely some embodiments of the present disclosure. For those of ordinary skill in the art, other drawings can be obtained based on these drawings without creative efforts.

FIG. 4 is a diagram schematically illustrating an example structure of a device group resource according to an embodiment of the disclosure.

DETAILED DESCRIPTION

Figure 1:
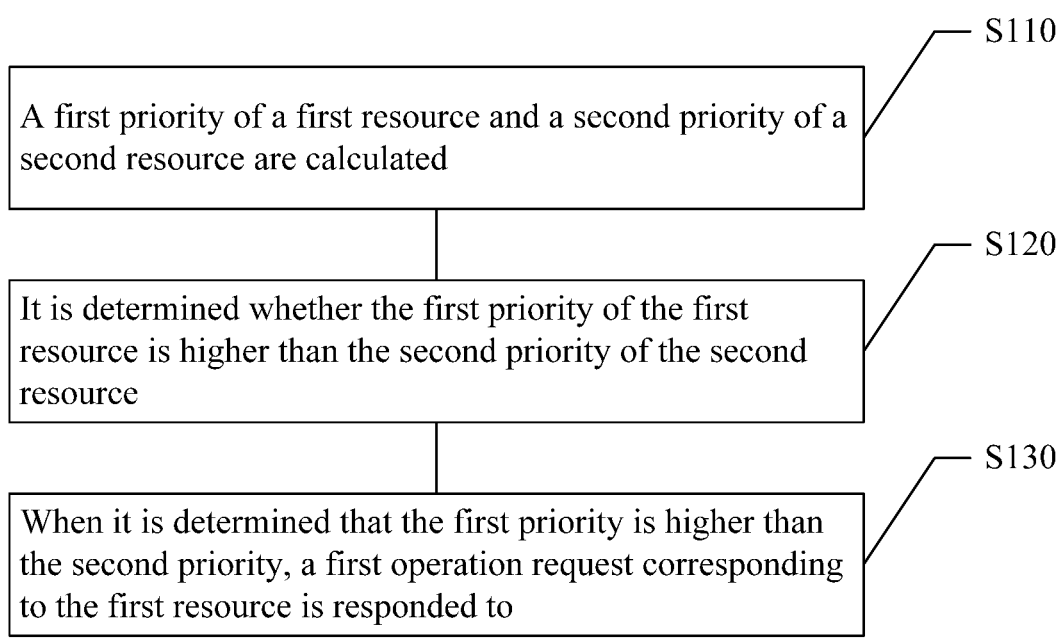
FIG. 1 is a flowchart schematically illustrating a priority-based resource processing method according to an embodiment of the disclosure.

Example embodiments will now be described more fully with reference to the accompanying drawings. However, the example embodiments can be implemented in various forms and should not be construed as limited to the examples set forth herein. Rather, the embodiments are provided such that the present disclosure will be more comprehensive and complete, and the concepts of the example embodiments will be fully conveyed to those skilled in the art. The described features, structures, or characteristics can be combined in any suitable manner in one or more embodiments. In the following description, numerous specific details are provided to give a thorough understanding of the embodiments of the present disclosure. However, those skilled in the art will realize that the technical solutions of the present disclosure can be practiced without one or more of the specific details, or other methods, components, devices, steps, or the like can be adopted. In other cases, well-known technical solutions are not shown or described in detail to avoid obscuring aspects of the present disclosure.

In addition, the drawings are merely schematic illustrations of the present disclosure and are not necessarily drawn to scale. The same reference numerals in the drawings represent the same or similar parts, and thus repeated descriptions thereof will be omitted. Some block diagrams shown in the drawings are functional entities and do not necessarily have to correspond to physically or logically independent entities. These functional entities can be implemented in the form of software, or implemented in one or more hardware modules or integrated circuits, or implemented in different networks and/or processor devices (e.g., one or more hardware processors), and/or microcontroller devices.

The Internet-of-Things system is a bridge between information producers and information consumers, and the specific communication process of which can include the following: the producer can continuously send information to the Internet-of-Things system; the Internet-of-Things system can store the information generated by the producer; and the consumer can continuously obtain information from the Internet-of-Things system for consumption.

Below, the entities specified in the Internet-of-Things agreement will be explained and illustrated. The agreement specifies two types of entities: Application Entity (AE) and Common Service Entity (CSE); wherein one entity can register with another entity; for example, AE can register with CSE, and CSE also can register with CSE, to create resources (AE resource or CSE resource) on CSE after successful registration. The AE can operate the resources on the CSE through CRUDN (the initials of create, retrieve, update, delete, and notify) operations, such as an UPDATE operation which requests to update container content under an AE resource.

Under the above Internet-of-Things architecture, functions related to devices and platforms are identified by resources, wherein, <AE> resource can be used to identify an application logic within a physical device, <node> resource can be used to identify relevant information of the physical device, <container> resource can be used to act as a container for storing specific content information, and <group> resource can group resources for management.

A notification subscription mechanism defined by the Internet-of-Things can adopt the following steps: an AE sends a subscription request to a CSE, and the request can include an event type that is subscribed; when the CSE generates a subscribed event type, an event is generated, and the CSE can send the generated event through a notification request to the AE; and upon receiving the notification request, the AE can feed back to the CSE response information indicating the receiving of the notification request.

This example embodiment first provides a priority-based resource processing method, applicable to a priority-based resource processing system, such as an Internet-of-Things system, a service system, or a CSE. Referring to FIG. 1, the priority-based resource processing method can include the following steps.

Step S110, a first priority of a first resource and a second priority of a second resource are calculated.

Step S120, it is determined whether the first priority of the first resource is higher than the second priority of the second resource.

Step S130, when it is determined that the first priority is higher than the second priority, a first operation request corresponding to the first resource is responded to.

In the above priority-based resource processing method, on the one hand, by setting the priorities, when a plurality of operation requests are received, the higher priority operation request is processed first, which can avoid the problem of confusion in responding to operation requests due to an excessive large number of operation requests, and can reduce the burden of the system. On the other hand, by responding to higher priority operation requests first, the response speed for higher priority operation requests can be improved, the service quality of the system can be improved, and the user experience can be improved.

Hereinafter, each step in the priority-based resource processing method in the example embodiment will be explained in detail.

In step S110, a first priority of a first resource and a second priority of a second resource are calculated.

First, the resources will be explained and illustrated. In conventional Internet-of-Things specifications, any devices, gateways, or business platforms and applications registered on them can be regarded as resources and each has a unique resource identifier, i.e, a URI (UniformResource Identifier), and a resource can be uniquely identified based on the resource identifier. The processing of the operation request on the accessed resource can include Create, Retrieve, Update, Delete, and Notify. It should be noted that there can be a plurality of resources on a device to which the accessed resource belongs, and the device to which the accessed resource belongs can determine the resource that the resource requester intends to access according to the identifier of the accessed resource.

Figure 2:
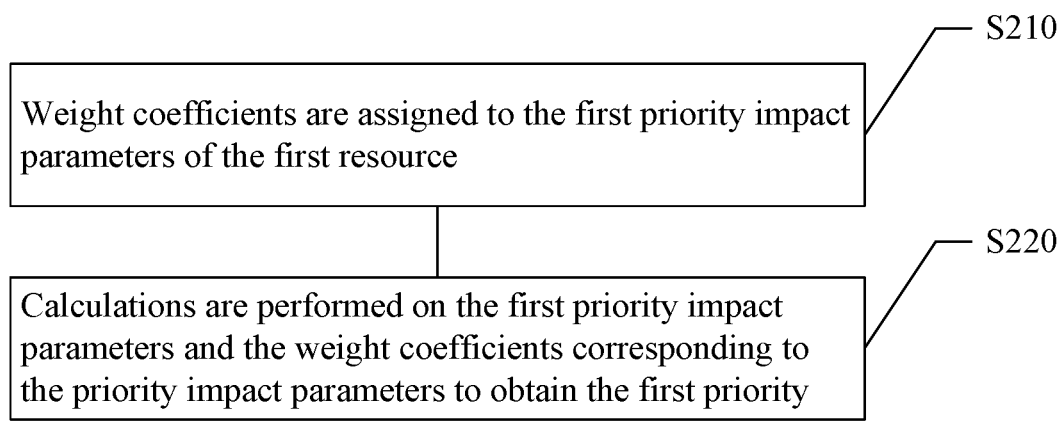
FIG. 2 is a flowchart schematically illustrating a method for calculating a first priority according to an embodiment of the disclosure.

Next, step S110 will be further explained and illustrated based on the above resources, wherein, calculating the first priority of the first resource and the second priority of the second resource can include: calculating the first priority of the first resource according to first priority impact parameters of the first resource; and calculating the second priority of the second resource according to second priority impact parameters of the second resource. It should be noted herein that the first resource and the second resource are only used to represent two different types of resources, and the order of the resources is not limited. Further, although the first resource and the second resource are used in this example, they are taken as an example for description, and an example including more types of resources also applies and also belongs to the protection scope of the present disclosure. Further, referring to FIG. 2, calculating the first priority of the first resource according to the first priority impact parameters of the first resource can include steps S210 and S220.

In step S210, weight coefficients are assigned to the first priority impact parameters of the first resource.

First, the first priority impact parameters of the first priority will be explained and illustrated. The first priority impact parameters of the first priority can include a first base priority, a total number of subscriptions of the first resource, a total number of retrieves of the first resource, a total number of updates of the first resource, and the like.

First base priority (baseQosLevel): the first base priority can be determined according to the level of the resource. A root resource has a top base priority, a direct child resource of the root resource has a second top priority, and so on so forth. When a resource may be a child resource of a plurality of resources, its priority is determined according to the priorities of its parent resources. For example: the priority of CSEBase is the top, 10, and the priorities of the direct child resources <AE>, <node> and <request> of CSEBase is 9, and <subscription> can be a child-resource of CSEBase or a child-resource of resources such as <AE>, so the priority of the resource <subscription> is determined according to the parent resource thereof.

Total number of subscriptions of the first resource (totalNrOfSubscriptions): the number of subscriptions of the first resource can be the number of subscribers; and can also be the number of resources <subscription>. Additionally, since different events can be determined through the event notification criteria eventNotificationCriteria, the number of subscriptions of the first resource may be the number of event notification criteria. The number of subscriptions of the first resource can also be any combination of the above three situations.

Number of retrieves of the first resource (totalNrOfRetrieve): the number of retrieves of the first resource can record a total number of retrieve requests currently received and save the number to totalNrOfRetrieve.

Total number of updates of the first resource (totalNrOfUpdate): the total number of first resources can record a total number of current update requests received and save the number to totalNrOfUpdate. It should be further noted that the first priority can be determined by one of the determining factors, or a combination of two or any three or a combination of the four factors collectively, which is not limited in the example.

Below, step S210 will be explained and illustrated based on the first priority impact parameters of the first priority. Weight coefficients are assigned to the first priority impact parameters of the first resource; wherein the number of the weight coefficients can be one, two, three, or four, and so on. The number of the weight coefficients and the number of determining factors are in a one-to-one correspondence, therefore, when the first priority is determined from one first priority impact parameter, one weight coefficient can be assigned; when the first priority is determined from two first priority impact parameters, two weight coefficients can be assigned, and so on so forth, which will not be elaborated herein.

In step S220, calculations are performed on the first priority impact parameters and the weight coefficients corresponding to the priority impact parameters to obtain the first priority.

After the weight coefficients have been assigned, the first priority can be obtained by performing calculation on the first priority impact parameters and the weight coefficients corresponding to the priority impact parameters of the first priority. The calculation can include multiplication and/or addition operations, and can also include other calculation, such as rounding or calculating remainder. This example does not specifically limit this. For example: when the first priority is determined by the four first priority impact parameters, the process of the multiplication operation can be:

first multiplication operation
result=$d1$*baseQosLevel;

second multiplication operation
result=$d2$*totalNrOfSubscriptions;

third multiplication operation
result=$d3$*totalNrOfRetrieve; and fourth multiplication operation
result=$d4$*totalNrOfUpdate.

The variables d1, d2, d3, and d4 denote the first weight coefficient, the second weight coefficient, the third weight coefficient, and the fourth weight coefficient, respectively. Therefore, the first priority can be:

dynamicQosLevel=$d1$*baseQosLevel+
$d2$*totalNrOfSubscriptions+
$d3$*totalNrOfRetrieve+$d4$*totalNrOfUpdate.

It should be further noted herein that in the above formula, at least one of d1, d2, d3, and d4 is not zero; and the values of d1, d2, d3, and d4 can be adjusted according to the requirements of different service systems. For example, if a system uses message notification as a main service thereof, the weights of d1 and d2 can be increased, and the weights of d3 and d4 can be reduced. For another example, if a service system mainly receives query requests passively, the weight of d2 can be increased. The weights of the other three parameters can be relatively reduced. Further, since the calculation method of the second priority is the same as the calculation method of the first priority, the present disclosure will not repeat the description herein.

Further, in order to facilitate the calculation of the first priority and the second priority described above, it is also necessary to obtain priority impact parameters of each priority. Specifically, it can include: obtaining the first priority impact parameters of the first resource and the second priority impact parameters of the second resource, wherein the priority impact parameters for each of the first priority and the second priority can include a base priority (baseQosLevel), a number of subscriptions (totalNrOfSubscriptions) of the resource, a number of retrieves (totalNrOfRetrieve) of the resource, and a total number of updates (totalNrOfUpdate) of the resource, therefore, the priority impact parameters for each of the first priority and the second priority can be obtained at the sending party of the operation request.

In step S120, it is determined whether the first priority of the first resource is higher than the second priority of the second resource. Specifically:

after the above calculations of the first priority of the first resource and the second priority of the second resource have been completed, it is determined whether the first priority of the first resource is higher than the second priority of the second resource. For example, if the first priority of the first resource is 58 and the second priority of the second resource is 42, it can be determined that the first priority of the first resource is higher than the second priority of the second resource.

In step S130, when it is determined that the first priority is higher than the second priority, a first operation request corresponding to the first resource is responded to. Here are some examples:

When, according to the above priority calculation method, the calculation result of the first priority obtained is higher than the calculation result of the second priority obtained, the first operation request corresponding to the first resource can be directly responded to first, wherein the first operation request can include Create, Retrieve, Update, Delete, Notify, and so on, and can also include other operations, such as adding and merging, etc. This example does not specifically limit this. By processing the resource subscription request with a higher priority first, the problem of causing confusion in responding to the resource subscription requests due to the excessive number of resource subscription requests can be avoided, and the burden on the system can be reduced.

Further, after the response to the first resource subscription request has been completed, an operation request corresponding to the second resource can be responded to after a preset time interval (which can be 3 min or 5 min, or other time interval, which is not particularly limited in this example), or can also be responded to when the CSE is idle. This example does not specifically limit this. In this way, the problem that the system cannot receive resource subscription requests sent by other device in a timely manner due to the system being in a dormant state after a long period of inactivity can be avoided, thereby improving the working efficiency of the entire system. It should be further noted herein that although the first resource and the second resource are taken as examples in this example, an example including more resources is also applicable, and also belongs to the protection scope of the present disclosure.

Figure 3:
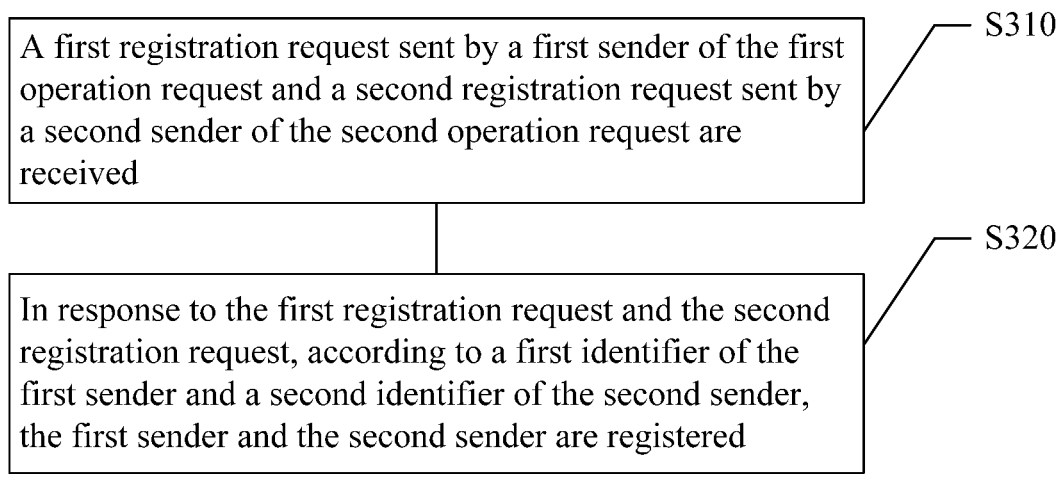
FIG. 3 is a flowchart schematically illustrating a method for registering a device group according to an embodiment of the disclosure.

Further, in order to verify the legitimacy of the received first operation request and the second operation request, it is also necessary to register the first sender of the first operation request and the second sender of the second operation. As shown in FIG. 3, it can include steps S310 and S320.

In step S310, a first registration request sent by a first sender of the first operation request and a second registration request sent by a second sender of the second operation request are received. Specifically:

the CSE receives the first registration request sent by the first sender of the first operation request and the second registration request sent by the second sender of the second operation request, wherein the first sender can include a plurality of first devices, for example, AE1, AE2, ..., AEN, and so on; and the second sender can include a plurality of second devices, for example, AE1, AE2, ..., AEM of another group, and so on. It should be further noted herein that the values of M and N can be the same or different, and there are no special restrictions in this example.

In step S320, in response to the first registration request and the second registration request, according to a first identifier of the first sender and a second identifier of the second sender, the first sender and the second sender are registered.

After the CSE receives the first registration request and the second registration request, the CSE responds to the first registration request and the second registration request, and according to the first identifier of the first sender and the second identifier of the second sender, registers the first sender and the second sender. By registering each sender, when receiving a subscription request sent by the sender, it is convenient to determine the legitimacy of the request based on the identifier and improve the security of the entire system.

Further, the requested resource can be a group resource. After registration of entities where a plurality of requested resources are located has been completed, a group resource is created for the plurality of requested resources. Referring to FIG. 4, the group resource can include the following parameters: device type (memberType), current number of devices (currentNrOfMembers), maximum number of devices (MaxNrOfMembers), device identifiers (memberIDs), and number of subscriptions (currentNrOfSubscriptions) of the group resource, number of retrieves (totalNrOfRetrieve) of the group resource, number of updates (totalNrOfUpdate) of the group resource, base priority (baseQosLevel) of the group resource, dynamic priority (dynamicQosLevel) of the group resource, current dynamic priority start time (dynamicQosStartTime) of the group resource, and fanout point (FanOutPoint).

Figure 5:
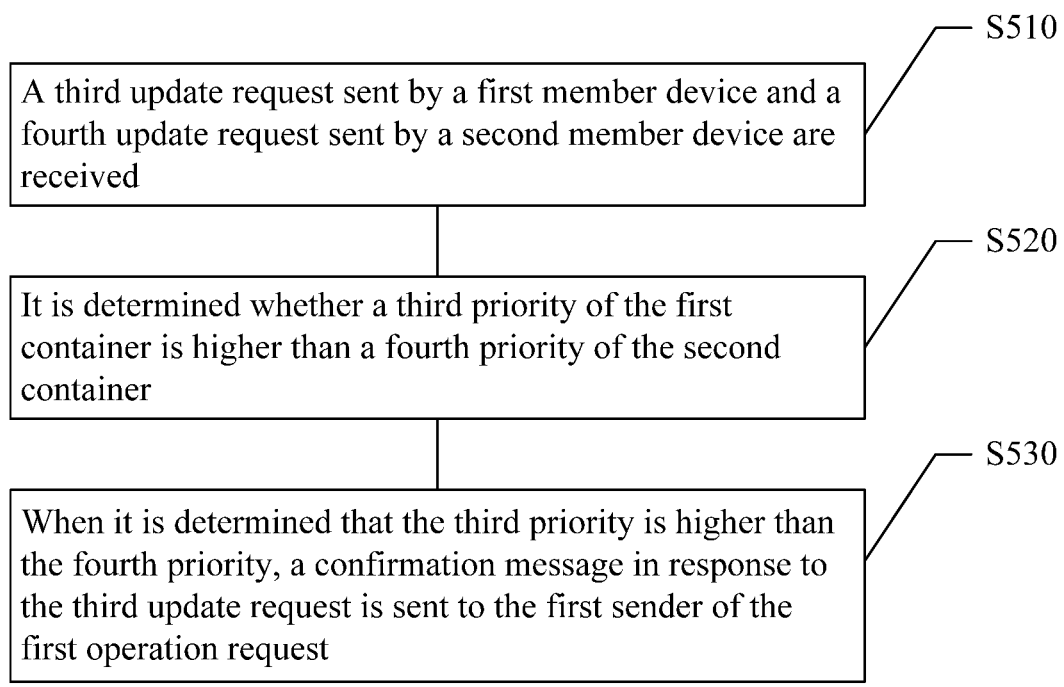
FIG. 5 is a flowchart schematically illustrating another priority-based resource processing method according to an embodiment of the disclosure.

The present disclosure also provides another priority-based resource processing method. Referring to FIG. 5, the priority-based resource processing method can include steps S510 to S530.

In step S510, a third update request sent by a first member device and a fourth update request sent by a second member device are received. Specifically:

first, the first member device can be, for example, a smoke sensor (AEx), and the second member device can be, for example, a temperature sensor (AEy). Further, when new information is updated in AEx and AEy, a third update request and a fourth update request can be sent to the CSE. When the CSE senses the third update request and the fourth update request sent by AEx and AEy, the CSE receives the third update request and the fourth update request.

In step S520, it is determined whether a third priority of the first member device is higher than a fourth priority of the second member device. Specifically:

after the CSE receives the third update request and the fourth update request, the CSE determines whether the third priority of the third update request is higher than the fourth priority of the fourth update request, wherein the third priority of the third update request and the fourth priority of the fourth update request can be determined according to factors of the respective member devices themselves.

Further, in order to facilitate the determination of the third priority and the fourth priority, the third priority and the fourth priority need to be calculated, which can specifically include: calculating the third priority of a first container and the fourth priority of a second container.

First, weight coefficients are assigned, wherein the number of weight coefficients can be one, two, three, four, and so on. Since the number of weight coefficients corresponds to the number of determining factors, when the third priority is determined by one determining factor, one weight coefficient can be assigned; when the third priority is determined by two determining factors, two weight coefficients can be assigned, and so on, which will not be repeated herein.

Further, after the weight coefficients have been assigned, one or more products can be obtained by multiplying the determining factors with the weight coefficients corresponding to the determining factors. For example, when the third priority is determined by four determining factors, the process of the multiplication operation can be:

first multiplication operation
result=$d1$*baseQosLevel;

second multiplication operation
result=$d2$*totalNrOfSubscriptions;

third multiplication operation
result=$d3$*totalNrOfRetrieve; and fourth multiplication operation
result=$d4$*totalNrOfUpdate, wherein, d1, d2, d3, and d4 denote weight coefficients respectively; the values of d1, d2, d3, and d4 can be adjusted according to requirements of different service systems. For example, if a system uses message notification as a main service thereof, the weights of d1 and d2 can be increased, and the weights of d3 and d4 can be reduced. In another example, if a service system mainly receives query requests passively, the weight of d2 can be increased, and the weight of the other three parameters can be relatively reduced.

Further, when there is one determining factor for the third priority, the multiplication operation result can be directly used as the third priority; for example, d1*baseQosLevel, or d2*totalNrOfSubscriptions, or d3*totalNrOfRetrieve, or d4*totalNrOfUpdate can be directly used as the third priority. When there are a plurality of determining factors for the third priority, the plurality of multiplication operation results can be added to obtain the third priority, for example:

dynamicQosLevel=$d1$*baseQosLevel+
$d2$*totalNrOfSubscriptions+
$d3$*totalNrOfRetrieve+$d4$*totalNrOfUpdate.

It should be further noted that a combination of two or any three multiplication operation results is also possible, which is not limited in the example. Further, the calculation method of the fourth priority and that of the third priority are the same, so it is not repeated hereinafter.

In step S530, when it is determined that the third priority is higher than the fourth priority, the third update request is responded to preferentially. When the first sender subscribes to the change information of the group resource, a notification message in response to the third update request is sent to the first sender.

When the calculation result of the third priority obtained is higher than the calculation result of the fourth priority according to the above priority calculation method, the confirmation message in response to the third update request can be directly sent to the first sender of the first operation request. By processing the update request with higher priority first, the problem of causing confusion in responding to the operation request due to the excessive number of operation requests can be avoided, and the burden on the system can be reduced.

Further, after the response to the third update request has been completed, the fourth update request can be responded to after a second preset time (which can be 3 min or 5 min, or other time, which is not particularly limited in this example). Further, when the first sender is subscribed to the change information of the group resource, a notification message in response to the third update request can be sent to the first sender, and after a second preset time interval (which can be 3 min or 5 min, or other time interval, which is not particularly limited in this example), a notification message in response to the fourth update request can be sent to the second sender, or, it is also possible to send the notification message in response to the fourth update request to the second sender when the CSE is idle. The example does not particularly limit this. In this way, the problem that the system cannot receive operation requests sent by other device in a timely manner due to the system being in a dormant state after a long period of inactivity can be avoided, thereby improving the working efficiency of the entire system.

Figure 6:
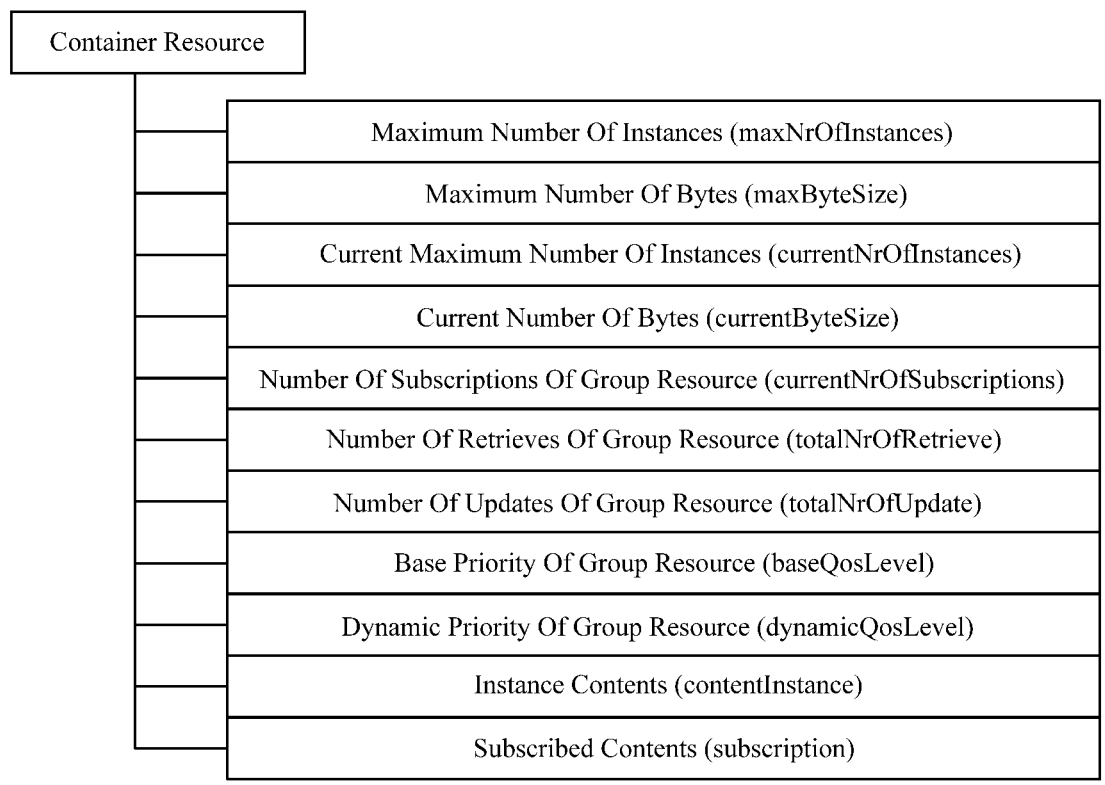
FIG. 6 schematically illustrates a structure example of a container resource according to an embodiment of the disclosure.

Further, the requested resource can be a non-group resource, such as a container resource. Referring to FIG. 6, the container resource can include the following parameters: maximum number of instances (maxNrOfInstances), maximum number of bytes (maxByteSize), current maximum number of instances (currentNrOfInstances), current number of bytes (currentByteSize), number of subscriptions (currentNrOfSubscriptions) of the group resource, number of retrieves (totalNrOfRetrieve) of the group resource, number of updates (totalNrOfUpdate) of the group resource, base priority (baseQosLevel) of the group resource, dynamic priority (dynamicQosLevel) of the group resource, instance contents (contentInstance) and Subscribed Contents (subscription), and so on.

Figure 7:
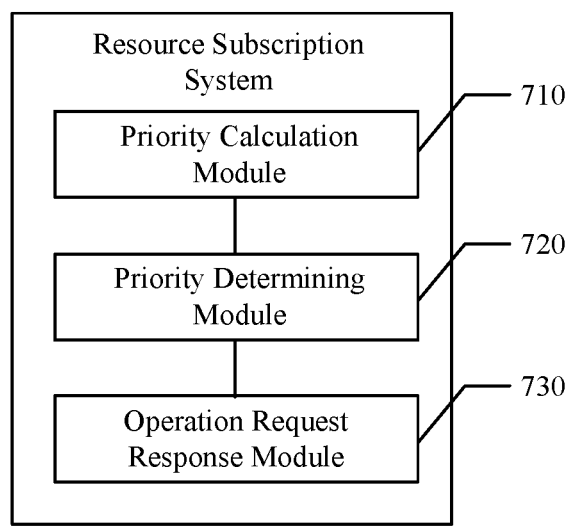
FIG. 7 is a block diagram schematically illustrating a priority-based resource processing system according to an embodiment of the disclosure.

The present disclosure also provides a priority-based resource processing system. Referring to FIG. 7, the priority-based resource processing system can include a priority calculation module 710, a priority determining module 720, and an operation request response module 730.

The priority calculation module 710 can be configured to calculate a first priority of a first resource and a second priority of a second resource.

The priority determining module 720 can be configured to determine whether the first priority of the first resource is higher than the second priority of the second resource.

The operation request response module 730 can be configured to respond to a first operation request corresponding to the first resource when it is determined that the first priority is higher than the second priority.

The specific details of each module in the priority-based resource processing system have been described in detail in the corresponding priority-based resource processing method, and therefore will not be repeated here.

In addition, although the various steps of the method of the present disclosure are described in a particular order in the drawings, this does not require or imply that the steps must be performed in that particular order or that all of the steps shown must be performed to realize the desired result. Additionally or alternatively, certain steps can be omitted, a plurality of steps can be combined into one step for execution, and/or one step can be split into a plurality of steps for execution, and so on.

From the description of the above embodiments, those skilled in the art can easily understand that the example embodiments described herein can be implemented by software, or by software in combination with necessary hardware. Therefore, the technical solution according to the embodiments of the present disclosure can be embodied in the form of a software product, which can be stored in a non-volatile storage medium (which can be a CD-ROM, a U disk, a mobile hard disk, etc.) or on a network, including several instructions to enable a computing device (which can be a personal computer, a server, a mobile terminal, or a network device, etc.) to execute the methods according to the embodiments of the present disclosure.

In an example embodiment of the present disclosure, there is also provided an electronic device capable of implementing the above method.

Those skilled in the art can understand that various aspects of the present disclosure can be implemented as systems, methods, or program products. Therefore, various aspects of the present disclosure can be embodied in the following forms: pure hardware implementation, pure software implementation (including firmware, microcode, etc.), or combination of hardware and software implementations, which can be collectively referred to herein as "circuit," "module," or "system."

An electronic device 800 according to the embodiment of the present disclosure will be described below with reference to FIG. 8. The electronic device 800 shown in FIG. 8 is merely an example, and should not impose any limitation on the functions and application scope of the embodiment of the present disclosure.

Figure 8:
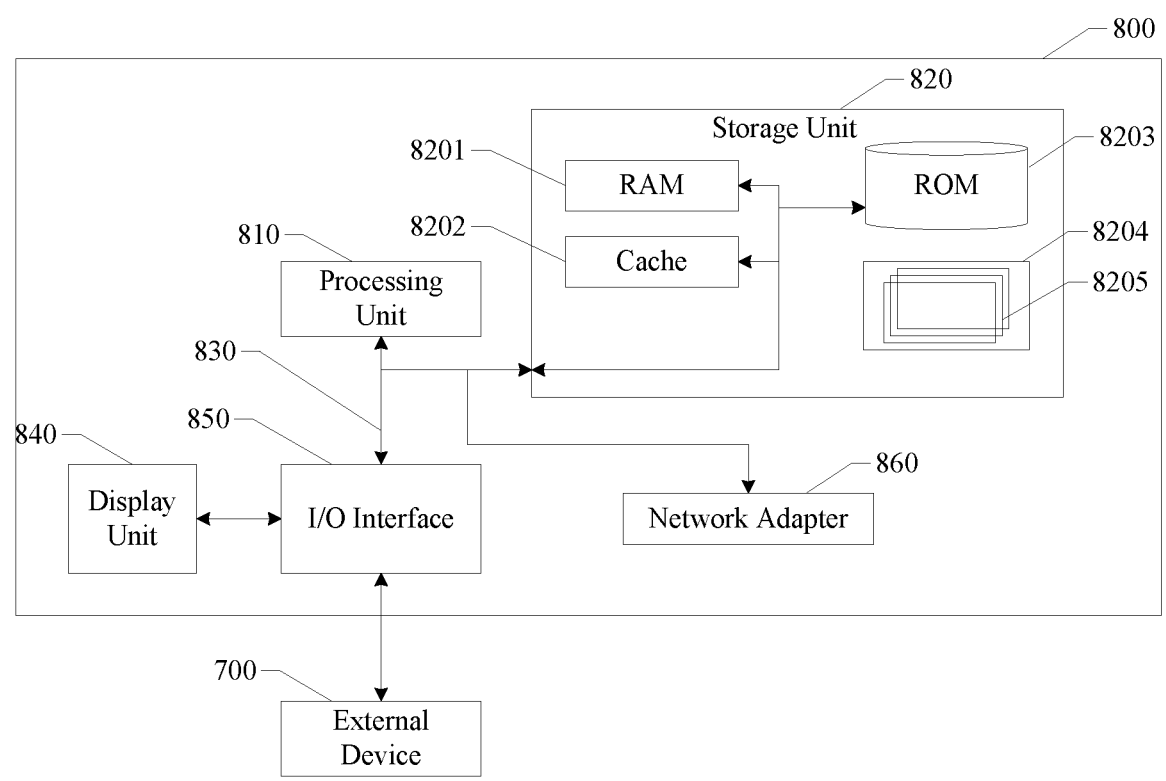
FIG. 8 is a block diagram schematically illustrating an electronic device for implementing the priority-based resource processing method according to an embodiment of the disclosure.

As shown in FIG. 8, the electronic device 800 is implemented in the form of a general-purpose computing device. The components of the electronic device 800 can include, but are not limited to, at least one processing unit 810, at least one storage unit 820, and a bus 830 connecting different system components (including the storage unit 820 and the processing unit 810).

The storage unit stores program codes, and the program codes can be executed by the processing unit 810, to cause the processing unit 810 to perform steps of various example embodiments according to the present disclosure described in the "exemplary method" section of the present specification. For example, the processing unit 810 can perform step S110 shown in FIG. 1: calculating a first priority of a first resource and a second priority of a second resource; step S120: determining whether the first priority of the first resource is higher than the second priority of the second resource; step S130: when determining that the first priority is higher than the second priority, responding to a first operation request corresponding to the first resource.

The storage unit 820 can include a readable medium in the form of a volatile storage unit, such as a random access storage unit (RAM) 8201 and/or a cache storage unit 8202, and can further include a read-only storage unit (ROM) 8203.

The storage unit 820 can further include a program/utility tool 8204 having a set of (at least one) program modules 8205. Such program modules 8205 include, but are not limited to, an operating system, one or more application programs, other program modules, and program data. Each or some combination of these examples can include an implementation of a network environment.

The bus 830 can be one or more of several types of bus structures, including a storage unit bus or a memory unit controller, a peripheral bus, a graphics acceleration port, a processing unit, or a local area bus of any of a variety of bus structures.

The electronic device 800 can also communicate with one or more external devices 700 (such as a keyboard, a pointing device, a Bluetooth device, etc.), and can also communicate with one or more devices that enable a user to interact with the electronic device 800, and/or with any device (such as a router, a modem, etc.) that enables the electronic device 800 to communicate with one or more other computing devices. Such communication can be performed through an input/output (I/O) interface 850. Moreover, the electronic device 800 can also communicate with one or more networks (such as a local area network (LAN), a wide area network (WAN), and/or a public network, such as the Internet) through the network adapter 860. As shown, the network adapter 860 communicates with other modules of the electronic device 800 through the bus 830. It should be understood that although not shown in the figure, other hardware and/or software modules can be used in conjunction with the electronic device 800, including but not limited to: microcode, device drivers, redundant processing units, external disk drive arrays, RAID systems, tape drives and data backup storage systems.

From the description of the above embodiments, those skilled in the art can easily understand that the example embodiments described herein can be implemented by software, or by software in combination with necessary hardware. Therefore, the technical solution according to the embodiments of the present disclosure can be embodied in the form of a software product, which can be stored in a non-volatile storage medium (which can be a CD-ROM, a U disk, a mobile hard disk, etc.) or on a network including instructions to cause a computing device (which can be a personal computer, a server, a terminal device, or a network device, etc.) to execute a method according to an embodiment of the present disclosure.

In an example embodiment of the present disclosure, there is also provided a computer-readable storage medium on which a program product capable of implementing the method of the present specification is stored. In some possible implementations, various aspects of the present disclosure can also be implemented in the form of a program product, which includes program codes. When the program product runs on a terminal device, the program codes are used to make the terminal device perform the steps according to various example embodiments of the present disclosure described in the "exemplary method" section of the present specification.

Figure 9:
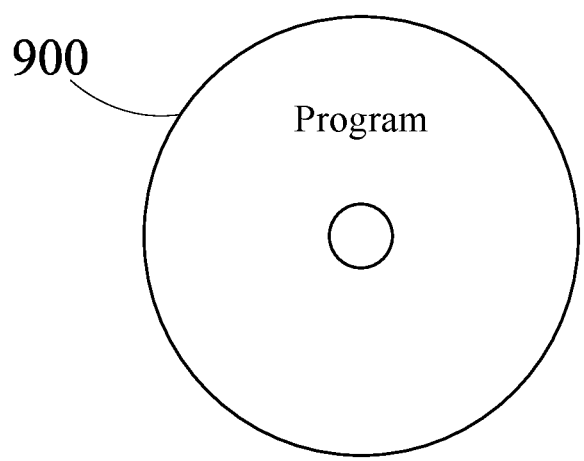
FIG. 9 is a diagram schematically illustrating a non-transitory computer-readable storage medium for implementing the priority-based resource processing method according to an embodiment of the disclosure.

Referring to FIG. 9, a program product 900 for implementing the above method according to an embodiment of the present disclosure is described. It can use a portable compact disc read-only memory (CD-ROM) and include program codes, and can be stored in a terminal device, for example for running on a personal computer. However, the program product of the present disclosure is not limited thereto. In this document, the readable storage medium can be any tangible medium containing or storing a program, and the program can be used by or in combination with an instruction execution system, apparatus, or device.

The program product can employ any combination of one or more readable media. The readable medium can be a readable signal medium or a readable storage medium. The readable storage medium can be, for example, but is not limited to, an electronic, magnetic, optical, electromagnetic, infrared, or semiconductor system, apparatus, or device, or any combination thereof. More specific examples (non-exhaustive list) of readable storage media include: electrical connections with one or more wires, portable disk, hard disk, random access memory (RAM), read-only memory (ROM), erasable Programmable read-only memory (EPROM or flash memory), optical fiber, portable compact disk read-only memory (CD-ROM), optical storage device, magnetic storage device, or any suitable combination of the above.

The computer-readable signal medium can include a data signal in baseband or propagated as part of a carrier wave, which carries readable program codes. Such a propagated data signal can take many forms, including but not limited to electromagnetic signals, optical signals, or any suitable combination of the above. The readable signal medium can also be any readable medium other than a readable storage medium, and the readable medium can send, propagate, or transmit a program for use by or in combination with an instruction execution system, apparatus, or device.

The program codes contained on the readable medium can be transmitted through any appropriate medium, including but not limited to wireless, wired, optical fiber cable, RF, etc., or any suitable combination of the above.

The program codes for performing the operations of the present disclosure can be written in any combination of one or more programming languages, which includes object-oriented programming languages, such as Java, C++, etc., and also includes conventional procedural programming language, such as "C" or a similar programming language. The program codes can be executed entirely on the user computing device, partly on the user device, as an independent software package, partly on the user computing device, partly on the remote computing device, or entirely on the remote computing device or on a server. In the case of a remote computing device, the remote computing device can be connected to the user computing device through any kind of network, including a local area network (LAN) or a wide area network (WAN), or it can be connected to an external computing device (for example, connected over the Internet of Internet service providers).

In addition, the above drawings are merely schematic illustrations of processes included in the method according to example embodiments of the present disclosure, and are not for limiting purposes. It would be easy to understand that the processes shown in the above drawings do not indicate or limit the chronological order of these processes. In addition, it would also be easy to understand that these processes can be performed synchronously or asynchronously in multiple modules, for example.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

What is claimed is:

1. A priority-based resource processing method for use with an Internet-of-Things system, comprising:
    obtaining first priority impact parameters of a first resource and second priority impact parameters of a second resource, wherein the first priority impact parameters comprise one or more of a first base priority, a number of subscriptions of the first resource, a number of retrievals of the first resource, and a number of updates of the first resource;
    calculating a first priority of the first resource and a second priority of the second resource, wherein the first priority of the first resource is calculated according to the first priority impact parameters of the first resource by:
        assigning weight coefficients for the first priority impact parameters of the first resource; and
        performing calculations on the first priority impact parameters and the weight coefficients corresponding to the first priority impact parameters to obtain the first priority,
        the first priority being a sum of a first weight coefficient multiplied times the first base priority, a second weight coefficient multiplied times the number of subscriptions of the first resource, a third weight coefficient multiplied times the number of retrievals of the first resource, and a fourth weight coefficient multiplied times the number of updates of the first resource, wherein at least one of the first weight coefficient, the second weight coefficient, the third weight coefficient, and the fourth weight coefficient is not zero;
    determining whether the first priority of the first resource is higher than the second priority of the second resource; and
    when determining that the first priority is higher than the second priority, responding to a first operation request corresponding to the first resource.

2. The priority-based resource processing method according to claim 1, wherein, after responding to the first operation request corresponding to the first resource, the priority-based resource processing method further comprises, after a first preset time interval, responding to a second operation request corresponding to the second resource.

3. The priority-based resource processing method according to claim 2, further comprising registering a first sender of the first operation request and a second sender of the second operation request.

4. The priority-based resource processing method according to claim 3, wherein registering the first sender of the first operation request and the second sender of the second operation request comprising:
    receiving a first registration request sent by the first sender of the first operation request and a second registration request sent by a second sender of the second operation request;
    in response to receiving the first registration request and the second registration request, registering the first sender and the second sender according to a first identifier of the first sender and a second identifier of the second sender; and responding to the first registration request and the second registration request; and
    after registering the first sender and the second sender, receiving a subscription request sent by the first sender or the second sender, and determining a legitimacy of the subscription request based on a corresponding identifier.

5. The priority-based resource processing method according to claim 1, wherein the first operation request comprises one or more of a creation request, a retrieve request, an update request, a delete request, and a notify request.

6. The priority-based resource processing method according to claim 1, wherein the priority-based resource processing method is performed by at least one hardware processor based on a computer program stored on a non-transitory computer-readable medium.

7. The priority-based resource processing method according to claim 1, wherein at least one of the first resource and the second resource comprises a unique resource identifier, and the unique resource identifier comprises a uniform resource identifier (URI).

8. An electronic device to be applied to an Internet-of-Things system, comprising:
   at least one hardware processor; and
   a memory storing program instructions executable by the at least one hardware processor that, when executed, direct the at least one hardware processor to:
      obtain first priority impact parameters of a first resource and second priority impact parameters of a second resource, wherein the first priority impact parameters comprise one or more of a first base priority, a number of subscriptions of the first resource, a number of retrievals of the first resource, and a number of updates of the first resource;
      calculate a first priority of the first resource and a second priority of the second resource, wherein the first priority of the first resource is calculated according to the first priority impact parameters of the first resource by:
         assigning weight coefficients for the first priority impact parameters of the first resource; and
         performing calculations on the first priority impact parameters and the weight coefficients corresponding to the first priority impact parameters to obtain the first priority,
         the first priority being a sum of a first weight coefficient multiplied times the first base priority, a second weight coefficient multiplied times the number of subscriptions of the first resource, a third weight coefficient multiplied times the number of retrievals of the first resource, and a fourth weight coefficient multiplied times the number of updates of the first resource, wherein at least one of
      the first weight coefficient, the second weight coefficient, the third weight coefficient, and the fourth weight coefficient is not zero;
         determine whether the first priority of the first resource is higher than the second priority of the second resource; and
         when it is determined that the first priority is higher than the second priority, respond to a first operation request corresponding to the first resource.

9. The electronic device according to claim 8, wherein, after responding to the first operation request corresponding to the first resource, the at least one hardware processor is further directed to, after a first preset time interval, respond to a second operation request corresponding to the second resource.

10. The system to claim 9, wherein the at least one hardware processor is further directed to register a first sender of the first operation request and a second sender of the second operation request.

11. The system according to claim 10, wherein the first sender of the first operation request and the second sender of the second operation request are registered by:
   receiving a first registration request sent by the first sender of the first operation request and a second registration request sent by a second sender of the second operation request;
   in response to receiving the first registration request and the second registration request, registering the first sender and the second sender according to a first identifier of the first sender and a second identifier of the second sender; and responding to the first registration request and the second registration request; and
   after registering the first sender and the second sender, receiving a subscription request sent by the first sender or the second sender, and determining a legitimacy of the subscription request based on a corresponding identifier.

12. The electronic device according to claim 8, wherein the first operation request comprises one or more of a creation request, a retrieve request, an update request, a delete request, and a notify request.

13. The system according to claim 8, wherein at least one of the first resource and the second resource comprises a unique resource identifier, and the unique resource identifier comprises a uniform resource identifier (URI).

14. A non-transitory computer-readable medium embodying program instructions executable by at least one hardware processor that, when executed, direct the at least one hardware processor to:
   obtain first priority impact parameters of a first resource and second priority impact parameters of a second resource, wherein the first priority impact parameters comprise one or more of a first base priority, a number of subscriptions of the first resource, a number of retrievals of the first resource, and a number of updates of the first resource;
   calculate a first priority of the first resource and a second priority of the second resource, wherein the first priority of the first resource is calculated according to the first priority impact parameters of the first resource by:
      assigning weight coefficients for the first priority impact parameters of the first resource; and
      performing calculations on the first priority impact parameters and the weight coefficients corresponding to the first priority impact parameters to obtain the first priority,
      first priority being a sum of a first weight coefficient multiplied times the first base priority, a second weight coefficient multiplied times the number of subscriptions of the first resource, a third weight coefficient multiplied times the number of retrievals of the first resource, and a fourth weight coefficient multiplied times the number of updates of the first resource, wherein at least one of the first weight coefficient, the second weight coefficient, the third weight coefficient, and the fourth weight coefficient is not zero;
   determine that the first priority of the first resource is higher than the second priority of the second resource; and
   in an instance in which it is determined that the first priority is higher than the second priority, respond to a first operation request corresponding to the first resource.

15. The non-transitory computer-readable medium according to claim 14, wherein, after responding to the first operation request corresponding to the first resource, the at least one hardware processor is further directed to, after a first preset time interval, respond to a second operation request corresponding to the second resource.

16. The non-transitory computer-readable medium according to claim 15, wherein the at least one hardware processor is further directed to register a first sender of the first operation request and a second sender of the second operation request.

17. The non-transitory computer-readable medium according to claim 16, wherein the first sender of the first operation request and the second sender of the second operation request are registered by:
  receiving a first registration request sent by the first sender of the first operation request and a second registration request sent by a second sender of the second operation request;
  in response to receiving the first registration request and the second registration request, registering the first sender and the second sender according to a first identifier of the first sender and a second identifier of the second sender; and responding to the first registration request and the second registration request; and
  after registering the first sender and the second sender, receiving a subscription request sent by the first sender or the second sender, and determining a legitimacy of the subscription request based on a corresponding identifier.

18. The non-transitory computer-readable medium according to claim 14, wherein the first operation request comprises one or more of a creation request, a retrieve request, an update request, a delete request, and a notify request.

19. The non-transitory computer-readable medium according to claim 14, wherein at least one of the first resource and the second resource comprises a unique resource identifier, and the unique resource identifier comprises a uniform resource identifier (URI).

* * * * *